(12) United States Patent
Blanchard et al.

(10) Patent No.: US 11,396,908 B2
(45) Date of Patent: Jul. 26, 2022

(54) SUSPENSION THRUST BEARING DEVICE AND SUSPENSION STRUT EQUIPED WITH SUCH A DEVICE

(71) Applicant: Aktiebolaget SKF, Gothenburg (SE)

(72) Inventors: Xavier Blanchard, Saint-Cyr-sur-Loire (FR); Guillaume Jouanno, Tours (FR); Bruno Montboeuf, Saint-Cyr-sur-Loire (FR); Desire Vidot, Ballan-Miré (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/744,909

(22) Filed: Jan. 16, 2020

(65) Prior Publication Data

US 2020/0240465 A1   Jul. 30, 2020

(30) Foreign Application Priority Data

Jan. 29, 2019  (DE) .......................... 102019201118.7

(51) Int. Cl.
*F16C 17/04* (2006.01)
*B60G 15/06* (2006.01)

(52) U.S. Cl.
CPC .......... *F16C 17/045* (2013.01); *B60G 15/067* (2013.01); *B60G 2204/124* (2013.01); *B60G 2204/128* (2013.01); *B60G 2204/418* (2013.01); *F16C 2326/05* (2013.01)

(58) Field of Classification Search
CPC ................ F16C 17/045; F16C 2326/05; F16C 2220/04; F16C 2202/06; F16C 27/04; B60G 15/067; B60G 2204/418; B60G 2204/124; B60G 2204/128; B60G 15/07
See application file for complete search history.

(56) References Cited

U.S. PATENT DOCUMENTS

| | | | |
|---|---|---|---|
| 6,736,381 B2 * | 5/2004 | Chesne ................ | B60G 15/063 267/220 |
| 9,381,784 B2 | 7/2016 | Stautner .................. | F16C 17/04 |
| 2004/0245691 A1 | 12/2004 | Handke ................ | B60G 15/068 267/292 |
| 2010/0014792 A1 | 1/2010 | Kellam | |

(Continued)

FOREIGN PATENT DOCUMENTS

| | | | | |
|---|---|---|---|---|
| DE | 102007024628 A1 | 12/2007 | | |
| DE | 102007024628 A1 | 12/2007 | ............ | F16C 35/042 |

(Continued)

OTHER PUBLICATIONS

Machine translation of KR20170017618 (Year: 2017).

*Primary Examiner* — Darlene P Condra
(74) *Attorney, Agent, or Firm* — Garcia-Zamor Intellectual Property Law; Ruy Garcia-Zamor; Bryan Peckjian

(57) ABSTRACT

A suspension thrust bearing device for use with a suspension spring in an automotive suspension strut of a vehicle. The device includes a bearing having upper and lower annular bearing members in relative rotation, the lower annular bearing member, and a damping element. An axial stiffening insert in a hub of lower annular bearing member provides a lower end curved towards the interior of the device. Lower annular bearing member has at least one slender groove opening radially outwards and having a bottom end opening axially downwards, the damping element providing a portion fitted within the slender groove.

9 Claims, 2 Drawing Sheets

(56) References Cited

U.S. PATENT DOCUMENTS

| | | | |
|---|---|---|---|
| 2011/0101584 A1 | 5/2011 | Viault | F16C 35/042 267/221 |
| 2011/0221158 A1 | 9/2011 | Stautner | B60G 15/068 280/124.147 |
| 2012/0146306 A1* | 6/2012 | Dubus | F16C 33/761 280/124.155 |
| 2012/0257849 A1 | 10/2012 | Corbett | F16C 33/60 384/607 |
| 2012/0292841 A1 | 11/2012 | Corbett | B60G 15/068 267/217 |
| 2014/0023308 A1 | 1/2014 | Stautner | F16C 33/581 384/615 |
| 2015/0367698 A1 | 12/2015 | Stautner | F16C 17/04 384/144 |
| 2017/0261032 A1* | 9/2017 | Lepine | F16C 19/12 |
| 2018/0236837 A1 | 8/2018 | Lutz | B60G 15/068 |
| 2018/0372152 A1* | 12/2018 | Gaultier | F16C 19/10 |
| 2021/0107327 A1 | 4/2021 | Blanchard | B60G 15/062 |

FOREIGN PATENT DOCUMENTS

| | | | |
|---|---|---|---|
| DE | 102016215757 A1 | 3/2018 | |
| DE | 102016215757 A1 | 3/2018 | ........... B60G 15/067 |
| EP | 0215231 B1 | 2/1990 | |
| FR | 2949525 A1 | 3/2011 | ........... F16C 33/588 |
| FR | 2949525 A1 | 3/2011 | |
| KR | 20170017618 A | 2/2017 | |
| KR | 20170017618 A | 2/2017 | |
| KR | 20170025879 A | 3/2017 | |
| KR | 20170025879 A | 3/2017 | |
| KR | 20170086371 A | 7/2017 | |
| KR | 20170086371 A | 7/2017 | |
| KR | 20200033219 A | 3/2020 | |
| KR | 20200033219 A | 3/2020 | |
| KR | 20200068974 A | 6/2020 | |
| KR | 20200068974 A | 6/2020 | ............ B60G 13/08 |
| WO | 2008152241 A2 | 12/2008 | |
| WO | WO-2008152241 A2 | 12/2008 | ........... B60G 15/068 |
| WO | 2018046038 A1 | 3/2018 | |
| WO | WO-2018046038 A1 | 3/2018 | ............ F16C 33/106 |

\* cited by examiner

SUSPENSION THRUST BEARING DEVICE AND SUSPENSION STRUT EQUIPED WITH SUCH A DEVICE

CROSS-REFERENCE TO RELATED APPLICATIONS

This application claims priority to German Patent Application no. 102019201118.7, filed Jan. 29, 2019, the contents of which are fully incorporated herein by reference.

TECHNICAL FIELD OF THE INVENTION

The present invention relates to a suspension thrust bearing device, in particular of the MacPherson type ("MacPherson Suspension Bearing Unit" or MSBU). The invention more particularly relates to a strut for a motor vehicle, having a damper and such a suspension thrust bearing device. The field of the invention is that of suspension systems, notably motor-vehicle suspension systems.

BACKGROUND OF THE INVENTION

In a known manner, a motor vehicle suspension system includes a suspension strut supporting an axle and a vehicle wheel. A suspension thrust bearing device is disposed in an upper portion of the suspension strut, opposite to the wheel and the ground, and between a suspension spring and an upper support block attached to the vehicle chassis.

The suspension thrust bearing device includes at least one bearing, for example a rolling bearing, comprising upper and lower annular bearing members in relative rotation around a main axis.

The suspension thrust bearing device enables transmission of axial forces between the spring and the body of the vehicle and, in the meantime, allows relative angular movement between the spring, which is mobile in rotation, and the fixed support block attached to the body.

The damping function of the suspension thrust bearing device can be improved using a damping element made of resilient material and mounted between the lower annular bearing member and the suspension spring. In a known manner, the damping element is overmolded onto the lower member.

However, the axial load and vibrations of suspension spring onto the damping element may induce axial and radial deformations of the element. Relative micro displacements may be induced between the damping element and the lower bearing element. This undesired damping element displacement leads to separation of damping element from the lower bearing element. The consequences are negative impact on damping performances. The suspension strut may have a reduced service life. It also leads to an extra noise which must be prohibited.

SUMMARY OF THE INVENTION

The aim of the invention is to overcome these drawbacks by proposing an enhanced suspension thrust bearing device. It is desirable to provide a suspension thrust bearing device which is relatively inexpensive, has a good operational reliability, and has an increased service life.

To this end, the invention relates to a suspension thrust bearing device, for use with a suspension spring in an automotive suspension strut of a vehicle. The suspension thrust bearing device comprises a bearing having upper and lower annular bearing members in relative rotation. The lower annular bearing member has an axial hub provided with an embedded axial stiffening insert.

The suspension thrust bearing device further comprises a damping element made of resilient material and interposed between the lower annular bearing member and the suspension spring, the damping element comprising an axial portion being mounted on outer surface of the axial hub of lower annular bearing member.

According to the invention, the axial stiffening insert comprises a lower end curved towards the interior of the device. The axial hub of lower annular bearing member comprises at least one slender groove opening radially outwards and having a bottom end opening axially downwards, the damping element comprising a portion fitted within the slender groove. The slender groove has in transverse cross-section a top wall inclined from the outer surface towards the bottom end such as the ratio between the distance defined between outer surface of axial stiffening insert and outer surface of axial hub of lower annular bearing member and the distance defined between the curved end of axial stiffening insert and the inclined top wall of the at least one slender groove is comprised between 0.8 and 1.2.

Thanks to the invention, the thickness of material of lower annular bearing member is roughly constant along the axial stiffening insert. The member is then more robust.

Another advantage of the invention is that the slender groove forms a mechanical retention means for the axial portion of damping element. The slender groove prevents any relative rotation between the damping element and the lower annular bearing member.

According to further aspects of the invention which are advantageous but not compulsory, such a suspension thrust bearing device may incorporate one or several of the following features:

The ratio is comprised between 0.9 and 1.1, and advantageously between 0.95 and 1.05.

The suspension thrust bearing device comprises a bearing with a first ring fixed to an upper cap, so as to form the upper annular bearing member of the suspension thrust bearing, and a second ring fixed to a lower cap, so as to form the lower annular bearing member of the suspension thrust bearing.

The first and second rings are made from a stamped metal sheet.

The upper and lower caps are made from a rigid plastic material.

The lower cap is provided with the axial hub of lower annular bearing member.

The lower cap comprises an outwardly radially-extending flange that extends from axial hub.

The axial stiffening insert is outwardly radially extended by a radial portion that is embedded in the outwardly radially-extending flange of lower cap.

The bearing is a rolling bearing, the first and second rings defining an annular rolling chamber between them and at least one row of rolling elements being disposed within the rolling chamber.

The rolling elements are balls.

The damping element is directly molded on the lower annular bearing member.

The damping element comprises rubber thermoplastic elastomer (TPE), in particular thermoplastic polyurethane (TPU), melt processible elastomer (MPE) or elastomer cellular foam.

The lower annular bearing member comprises a plurality of the slender grooves.

The slender grooves are circumferentially equally spaced.

The invention also relates to a motor vehicle suspension strut comprising a damper rod, a suspension spring, and a suspension thrust bearing device as mentioned above.

BRIEF DESCRIPTION OF THE DRAWINGS

The invention will now be explained in correspondence with the annexed figures, as an illustrative example, without restricting the object of the invention. In the annexed figures.

DETAILED DESCRIPTION OF SOME EMBODIMENTS

Figure 1:
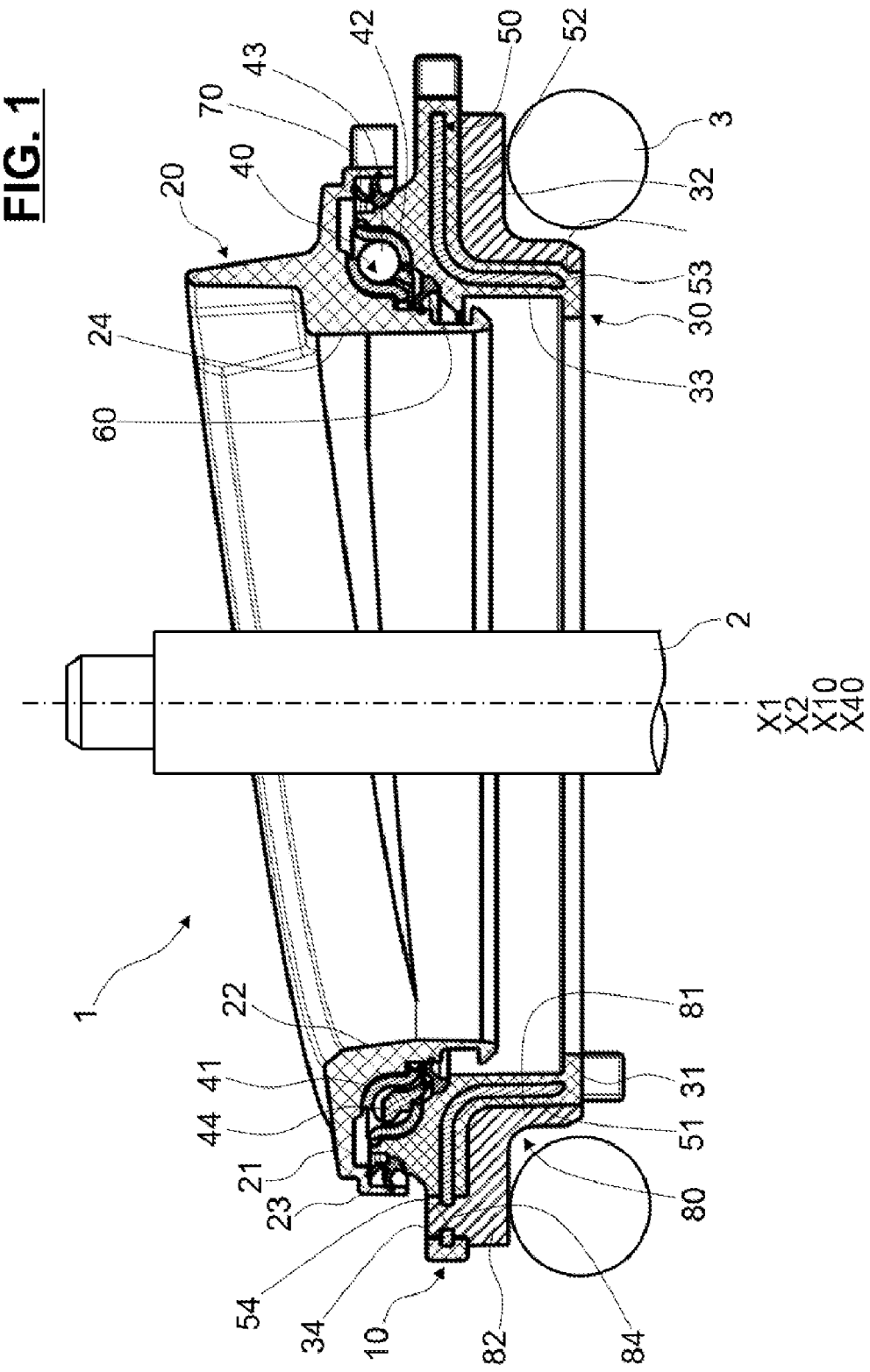
FIG. 1 is a sectional view of a suspension strut according to a first embodiment of the invention, comprising a suspension thrust bearing unit also according to a first embodiment of the invention, and a damper rod and a suspension spring.

A suspension strut 1, partially shown in FIG. 1, is incorporated into a motor-vehicle suspension system. The suspension strut 1 supports a vehicle axle and wheel which are not shown for the purposes of simplification. The suspension strut 1 extends along a main axis X1, placed in substantially vertical direction when the wheel of the vehicle rests on flat ground. The suspension strut 1 comprises a damper piston including a piston body and a damper rod 2 of axis X2, a coil suspension spring 3 and a suspension thrust bearing device 10. The rod 2 and the spring 3 are partially shown in FIG. 1, while the piston body is not shown for the purposes of simplification.

The suspension thrust bearing device 10 with main axis X10 is mounted between the spring 3 and a support block (not shown) connected to the chassis of a motor vehicle. The axis X2 and X10 coincide with the main axis X1 when the suspension system of the vehicle is at rest, as illustrated in FIG. 1.

Hereinafter, the adjectives "axial" and "radial" are defined relative to the main axis X10 of the annular thrust bearing device 10.

The suspension thrust bearing device 10 comprises an upper cap 20, a lower cap 30 and a single rolling bearing 40. In this embodiment, these three components 20, 30 and 40 are of globally circular shape about a main axis X40 coinciding with the main axis X10 when the suspension system of the vehicle is at rest.

The upper cap 20 consists in a one-piece part made from plastic synthetic material, for example from polyamide, optionally reinforced with glass fibers. The upper cap 20 has a radially-extending flange 21, an inner axially-extending hub 22 of relatively small diameter and extending towards the lower side of the suspension thrust bearing device 10, and an outer axially-extending skirt 23 of relatively large diameter and extending towards the lower side of the suspension thrust bearing device 10. The inner hub 22 defines an inner bore 24 for the suspension thrust bearing device 10 wherein the damper rod 2 is mounted.

The upper cap 20 is dedicated to be fixed to a support block of the automotive vehicle chassis.

The rolling bearing 40 comprises a pressed sheet metal inner race 41, an outer race 42 also of pressed sheet metal, a row of rolling elements 43, here balls, and a cage 44 for maintaining a regular circumferential spacing between the rolling elements 43. The rolling elements 43 are disposed in a rolling chamber defined between raceways formed by toroidal portions of the inner race 41 and outer race 42.

As an alternative not shown, no rolling elements need to be used but rather the inner and outer races may directly contact each other, with a suitable low friction material, coating, or lubricant being used.

The rolling bearing 40 is integrally radially located between the inner hub 22 and the outer skirt 23 of the upper cap 20. The inner race 41 is fitted within a toroidal inner portion of the lower cap 30. The inner race 41 and the lower cap 30 form a lower annular bearing member. The outer race 42 is fitted onto a toroidal outer portion provided on the lower side of flange 21 of the upper cap 20. The outer race 42 and the upper cap 20 form an upper annular bearing member. The upper and lower annular bearing members are in relative rotation with respect to the axis X40.

The lower cap 30 comprises an axially-extending hub 31 defining an inner bore 33 wherein the rod 2 axially extends. The lower cap 30 further comprises a radial flange 32 that radially outwardly extends from the hub 31. The toroidal outer portion supporting the inner race 41 of the rolling bearing 40 is provided on an upper surface of the radial flange 32.

The lower cap 30 comprises a stiffening insert 34 extending along the hub 31 and the flange 32 so as to support the load and the shocks exerted by the spring 3.

As illustrated in FIG. 1, the lower cap 30 is further provided with a stiffening insert 50. The stiffening insert 50 may be in metal or in a rigid plastic. The stiffening insert 50 comprises an axially-extending hub 51 embedded within the hub 31 of lower cap 30. The stiffening insert 50 further comprises an outwardly radially-extending flange 52 connected to the hub 51, the insert flange 52 being embedded within the radial flange 32 of lower cap 30. Advantageously, the lower cap 30 is overmolded onto the stiffening insert 50. The hub 51 of stiffening insert 50 permits to support radial load and shocks exerted by the suspension spring 3 onto the hub 31 of lower cap 30, and the flange 52 of stiffening insert 50 permits to support axial load and shocks exerted by the suspension spring 3 onto the radial flange 32 of lower cap 30. The stiffening insert 50 permits to prevent any deformation of lower cap 30.

Figure 2:
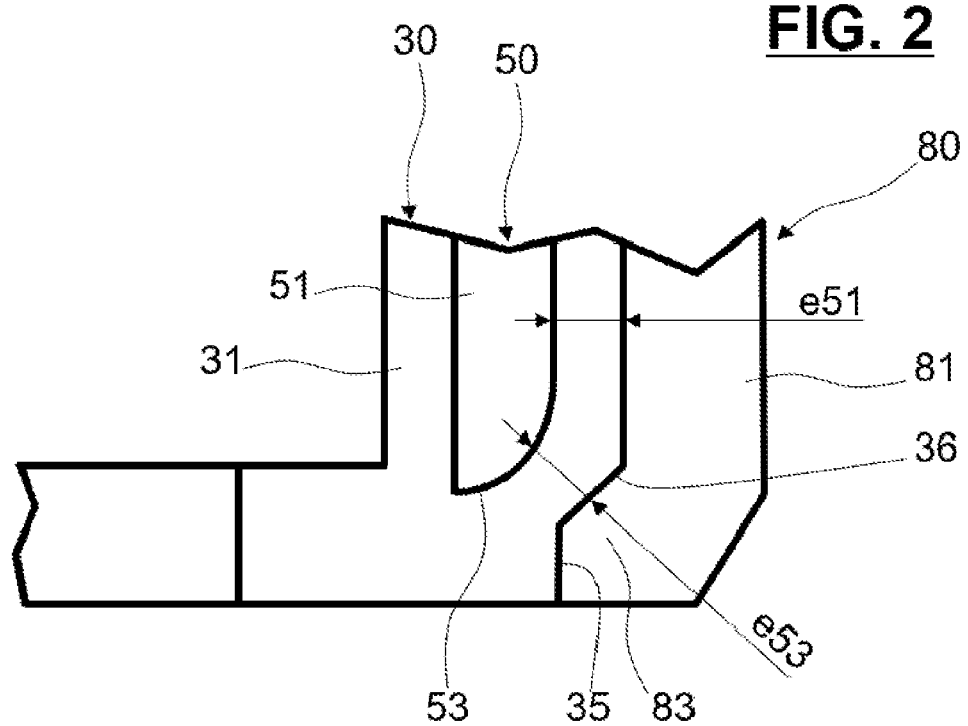
FIG. 2 is a detailed view of FIG. 1.

As illustrated in FIGS. 1 and 2, the axial hub 51 of stiffening insert 50 has a lower end 53 that is curved towards the interior of device 10. More precisely, the stiffening insert 50 is obtained by deformation and cut of a metal sheet, and the end 53 of hub 51 is cut after having been bended.

Inner sealing means 60 are provided between an inner periphery of the radial flange 32 of the lower cap 30 and the inner hub 22 of the upper cap 20. Outer sealing means 70 are provided between an outer periphery of the radial flange 32 of the lower cap 30 and the outer skirt 23 of the upper cap 20.

The lower cap 30 is further provided with a damping element 80 made from a resilient material so as to enable vibrations to be filtered.

The tubular axial portion 81 axially extends from the radial portion 82 towards the lower side of the suspension thrust bearing device 10. The tubular axial portion 81 is tightly fastened to an outer cylindrical surface of the hub 31 of the lower cap 30. The tubular axial portion 81 of the damping element 80 supports radial load and shocks from the suspension spring 2.

The damping element 80 comprises a tubular axial portion 81 and a radial portion 82. The radial portion 82 is tightly fastened to the lower side of the radial flange 32 of the lower cap 30. The radial portion 82 comprises a lower radial side for receiving an end turn of the suspension spring 3 in bearing contact. The radial portion 82 of the damping element 80 supports axial load and shocks from the suspension spring 3.

The tubular axial portion 81 and radial portion 82 of the damping element 80 are connected together so as to cover the exterior surface of the axial hub 31 and the radial flange 32 of the lower cap 30.

The damping element 80 is made from a resilient material, such as rubber thermoplastic elastomer (TPE), in particular thermoplastic polyurethane (TPU), melt processable elastomer (MPE) or elastomer cellular foam.

The damping element 80 is advantageously overmolded onto the lower cap 30.

Advantageously, the radial flange 32 of lower cap 30 comprises a plurality of axial through holes 34. The through holes 34 extend radially through the thickness of radial flange 32 from lower side supporting the damping device 80 to upper side. In the illustrated embodiment of FIG. 2, radial through holes 34 are equally circumferentially spaced. Alternatively, radial through holes 34 may be unevenly spaced. In the illustrated embodiment of FIG. 2, the radial flange 32 comprises eight axial through holes 34. Alternatively, the radial flange 32 may comprise less or more axial through holes 34. In the illustrated embodiment of FIG. 2, the axial though holes 34 are cylindrical. Alternatively, the axial through holes may be of any other suitable shape.

The radial flange 52 of stiffening insert 50 also comprises a plurality of axial through holes 54. The radial flange 52 of stiffening insert 50 is embedded within the radial flange 32 of lower cap 30, and the insert axial through holes 54 are provided within the lower cap through holes 34. Insert axial through holes 54 are each of the same number, position and centre as lower cap axial through holes 34.

The insert through holes 54 are each of lower diameter than the diameter of cap through holes 34. Then the insert through hole 54 define a narrowing section in each of the cap through holes 34.

The radial flange 81 of damping element 80 further comprises a plurality of upwardly axially-extending pins 84. Pins 84 are each fitted into a corresponding axial through hole 34 of lower cap 30, and into a corresponding axial through hole 54 of insert 50. Pins 84 are each provided with a circumferential groove wherein the insert 50 is fitted. Since the insert through holes 54 are of reduced diameter with respect to the cap through holes 34, the pins 84 define upper and lower shoulders that axially block the insert 50. Advantageously, the pins 84 of damping element 80 are overmolded within the through holes 34, 54.

The combination of pins 84 and axial through holes 34 and 54 forms axial mechanical retention means for the damping element 80 with the lower cap 30. More precisely, the radial flange 82 of damping element 80 is preventing for separating from the lower side of radial flange 32 of lower cap 30.

As an alternate embodiment not illustrated, the axial hub 31 of lower cap 30 and the axial hub 51 of stiffening insert 50 may comprises associated radial through holes. The damping element 80 has radial pins fitted within the holes and radially blocked by insert holes of reduced diameter with respect to cap holes.

According to the invention, the axial hub 31 of lower cap 30 comprises a plurality of slender grooves 35. The slender grooves 35 are each open radially outwards and have each a bottom end opening axially downwards. The slender grooves 35 have each in transverse cross-section a top wall 36 inclined from the outer surface of hub 31 towards the bottom open end of the grooves 35.

The top walls 36 are each inclined such as the ratio between the distance e51 defined between outer surface of axial hub 51 of insert 50 and outer surface of axial hub 31 of lower cap 30 and the distance e53 defined between the curved end 53 of axial hub 51 of insert 50 and the inclined top walls 36 of the slender grooves 35 is comprised between 0.8 and 1.2. As an advantageous embodiment, the ratio is comprised between 0.9 and 1.1, and advantageously between 0.95 and 1.05.

Figure 3:
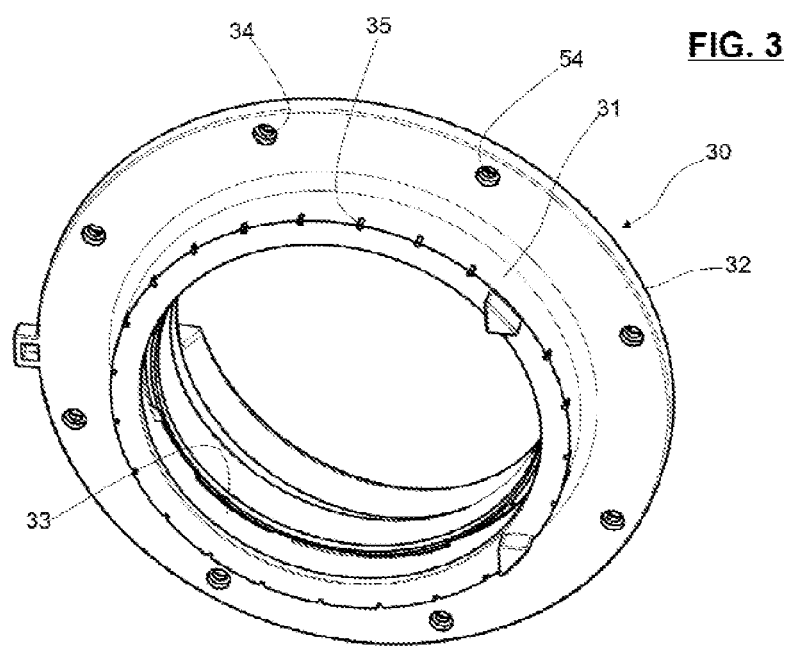
FIG. 3 is a perspective view of a lower cap body provided to the suspension strut of FIG. 1.

In the embodiment illustrated in FIG. 3, the lower cap 30 comprises a plurality of circumferentially equally-spaced slender grooves 35. Alternatively, the slender grooves are unevenly circumferentially spaced. Alternatively, the lower cap 30 comprises only one slender groove 35.

The damping element 80 comprises a plurality of portions 83 fitted within the slender grooves 35. The combination of portion 83 with grooves 35 form mechanical retention means for the damping element 80 with the lower cap 30. More precisely, the cooperation of portion 83 and grooves 35 prevents any relative rotation between the axial hub 81 of damping element and the axial hub 31 of lower cap 30.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provided improved cam follower roller device.

Moreover, various features of the above-described representative examples, as well as the various independent and dependent claims below, may be combined in ways that are not specifically and explicitly enumerated in order to provide additional useful embodiments of the present teachings.

The invention claimed is:

1. A suspension thrust bearing device for use with a suspension spring in an automotive suspension strut of a vehicle, the suspension thrust bearing device comprising:
   a bearing having an upper annular bearing member and a lower annular bearing member in relative rotation, the lower annular bearing member having an axial hub provided with an embedded axial stiffening insert, and
   a damping element made of resilient material and interposed between the lower annular bearing member and the suspension spring, the damping element comprising an axial portion being mounted on outer surface of the axial hub of lower annular bearing member, wherein
   the axial stiffening insert comprises a lower end curved towards the interior of the device,
   the axial hub of lower annular bearing member comprises at least one slender groove opening radially outwards and having a bottom end opening axially downwards, the damping element comprising a portion fitted within the slender groove, and
   the slender groove has in transverse cross-section a top wall inclined from the outer surface towards the bottom end such as the ratio between the distance defined between outer surface of axial stiffening insert and outer surface of axial hub of lower annular bearing member and the distance defined between the curved end of axial stiffening insert and the inclined top wall of the at least one slender groove is comprised between 0.8 and 1.2.

2. The device according to the claim 1, wherein the lower annular bearing member comprises a plurality of the slender grooves.

3. The device according to the claim 2, wherein the slender grooves are circumferentially equally spaced.

4. The device according to claim 1, wherein the suspension thrust bearing device comprises the bearing having a first ring fixed to an upper cap, so as to form the upper annular bearing member of the suspension thrust bearing, and a second ring fixed to a lower cap, so as to form the lower annular bearing member of the suspension thrust bearing.

5. The device according to the claim 4, wherein the lower cap is provided with the axial hub of lower annular bearing member.

6. The device according to the claim 5, wherein the lower cap comprises an outwardly radially-extending flange that extends from axial hub.

7. The device according to the claim 6, wherein the axial stiffening insert is outwardly radially extended by a radial portion that is embedded in the outwardly radially-extending flange of lower cap.

8. The device according to claim 1, wherein the damping element is directly molded on the lower annular bearing member.

9. A motor vehicle suspension strut comprising:
a damper rod,
a suspension spring, and
a suspension thrust bearing device for use with a suspension spring in an automotive suspension strut of a vehicle, the suspension thrust bearing device comprising:

a bearing having an upper annular bearing member and a lower annular bearing member in relative rotation, the lower annular bearing member having an axial hub provided with an embedded axial stiffening insert, and a damping element made of resilient material and interposed between the lower annular bearing member and the suspension spring, the damping element comprising an axial portion being mounted on outer surface of the axial hub of lower annular bearing member, wherein the axial stiffening insert comprises a lower end curved towards the interior of the device, the axial hub of lower annular bearing member comprises at least one slender groove opening radially outwards and having a bottom end opening axially downwards, the damping element comprising a portion fitted within the slender groove, and the slender groove has in transverse cross-section a top wall inclined from the outer surface towards the bottom end such as the ratio between the distance defined between outer surface of axial stiffening insert and outer surface of axial hub of lower annular bearing member and the distance defined between the curved end of axial stiffening insert and the inclined top wall of the at least one slender groove is comprised between 0.8 and 1.2.

* * * * *